Figure 1:
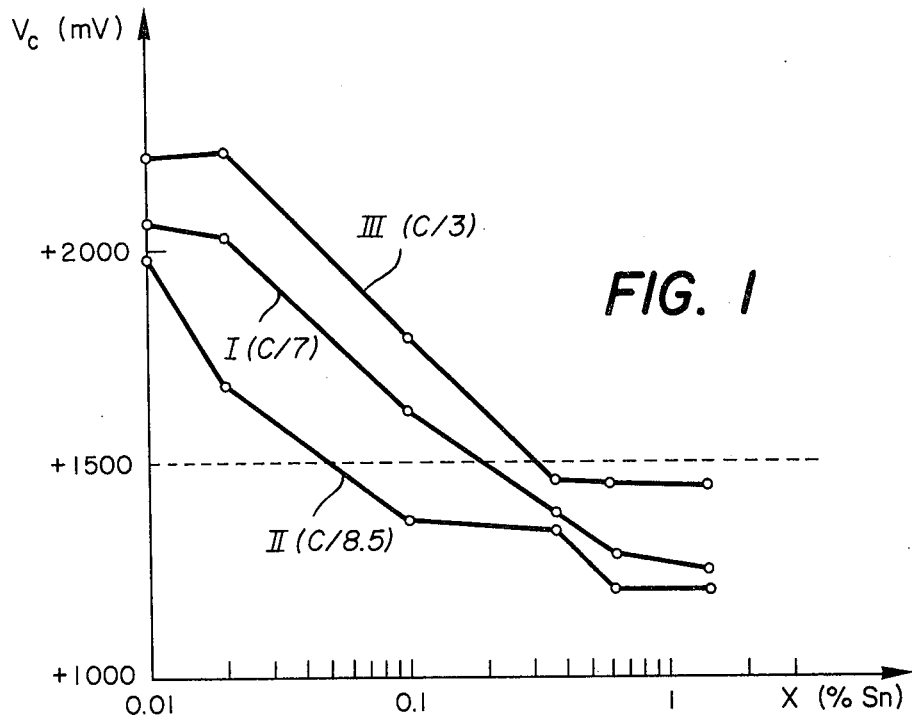

United States Patent

Giess et al.

[11] 4,092,462
[45] May 30, 1978

[54] ELECTRODE GRIDS FOR LEAD ACCUMULATORS

[75] Inventors: Herbert Giess, Geneva, Switzerland; Brian Burrows, Mississauga, Canada; Marie-Michelle Janssoone, Annecy, France

[73] Assignee: Battelle Memorial Institute, Geneva, Switzerland

[21] Appl. No.: 786,259

[22] Filed: Apr. 11, 1977

[30] Foreign Application Priority Data

Apr. 13, 1977 Switzerland .................. 4653/77

[51] Int. Cl.² ........................................ H01M 10/44
[52] U.S. Cl. .................................... 429/50; 429/225; 429/245; 75/166 D
[58] Field of Search .............. 429/245, 225–228, 429/50; 75/166 D, 166 R

[56] References Cited

U.S. PATENT DOCUMENTS

| | | | |
|---|---|---|---|
| 2,820,079 | 1/1958 | Zahn | 429/245 |
| 3,078,161 | 2/1963 | Zahn | 75/166 |
| 3,147,114 | 9/1964 | Hack et al. | 75/166 D |
| 3,287,165 | 11/1966 | Jensen | 429/245 |

FOREIGN PATENT DOCUMENTS

| | | |
|---|---|---|
| 295,151 | 2/1954 | Switzerland. |
| 812,537 | 4/1959 | United Kingdom. |

*Primary Examiner*—Charles F. LeFevour
*Attorney, Agent, or Firm*—Finnegan, Henderson, Farabow & Garrett

[57] ABSTRACT

An electrode grid for lead accumulators, said grid being formed from a lead alloy free from antimony and consisting of tellurium, arsenic and silver in a total concentration of at most 0.1% by weight, at least 0.1% tin by weight of the alloy, and the balance pure lead.

5 Claims, 2 Drawing Figures

ELECTRODE GRIDS FOR LEAD ACCUMULATORS

The present invention relates to lead accumulators (batteries) and more particularly to an improved lead alloy for use in making electrode grids.

The electrode grids of lead-acid accumulators have generally been made from lead-antimony alloys in which the antimony serves to assist in the casting and to improve the mechanical strength of the alloy.

Nevertheless, a poisoning effect on the negative plates by the antimony deposited on their surface leads to serious disadvantageous, such as for example self-discharging, the production of poisonous gases, and incomplete recharging.

Thus, various alloys have been proposed containing a reduced amount of antimony and small amounts of other alloy additives such as arsenic, tin, silver and copper, are added to obtain the required mechanical strength, protection against corrosion, improved casting, etc.

Such known lead alloys having a reduced amount of antimony nevertheless have these disadvantages owing to the poisoning of the negative plates by the antimony.

Thus, lead-calcium alloys have been proposed which do not contain antimony, but which nevertheless require more complicated casting techniques and are subject to a loss of calcium due to oxidation during the casting. On account of the fact that the amount of calcium is generally less than 0.1% by weight, any uncontrolled loss of highly reactive calcium is clearly undesirable. It has therefore been proposed to add 0.1% to 1.0% of tin in order to reduce the formation of dross and thereby reduce the loss of calcium during the casting. Such lead-calcium alloys nevertheless require fairly complicated casting techniques.

Other lead alloys are also known in which the antimony is replaced by other alloy elements intended to confer the required properties on the electrode grids.

The elements used for this purpose are in particular arsenic, tellurium, silver and copper.

These elements are however liberated as a result of corrosion of the grids of the positive plates, and are deposited on the negative plates. Since the hydrogen overvoltage on these elements is less than that on lead, an undesirable discharge of hydrogen takes place both during the recharging period and while the accumulator is not in use.

The result is on the one hand an incomplete recharging accompanied by excessive consumption of water, and on the other hand an increased self-discharging.

In order to obviate as much as possible these harmful effects of the poisoning of the negative plates by the said elements, attempts have accordingly been made to reduce the amount of these elements in the alloy to the absolute minimum necessary to confer a sufficient hardness or other required properties on the electrode grids.

Lead alloys are therefore known which are free from antimony and certain tellurium, silver and arsenic as alloying elements, at least 99.9% by weight of the resultant alloy consisting of pure lead.

It should be noted that the expression "pure lead" such as also used hereinafter with respect to the present invention is understood here in the sense of "Feinblei" (fine lead) such as defined by DIN Standard 1719, which contains 99.985% to 99.99% of lead and may include a total amount at most equal to 0.01% to 0.015% by weight, of the elements Ag, As, Bi, Cu, Fe, Sb, Sn, Zn.

These known alloys of the type formed essentially from pure lead, with only a very small total amount (maximum 0.1% by weight) of Te, Ag and As as alloy additives, have important advantages such as easy casting, good corrosion resistance, good mechanical strength, and negligible poisoning of the negative plates.

Now, it has been found that when lead-acid accumulators having electrode grids formed from lead alloys with a small content of antimony or which are free from antimony, are recharged straight after having been completely discharged, the positive electrodes are subjected to a passivation with excessive polarization, which raises their potential to too high a value to ensure a proper recharging of the accumulator with conventional apparatus.

The aim of the present invention is to provide an improved antimony-free lead alloy of the type in which at most 0.1% by weight comprises the alloy elements Te, As and Ag, and which will enable poisoning of the negative electrodes and excessive polarization during the recharging to be simultaneously prevented.

The present invention is an electrode grid for lead accumulators, this grid being formed from a lead alloy which is free from antimony and which contains the three alloy elements tellurium, arsenic and silver in a total overall concentration at most equal to 0.1% by weight of these three elements in the alloy, and tin at least equal to 0.1% by weight of the alloy, the remainder of the alloy being pure lead.

Figure 2:
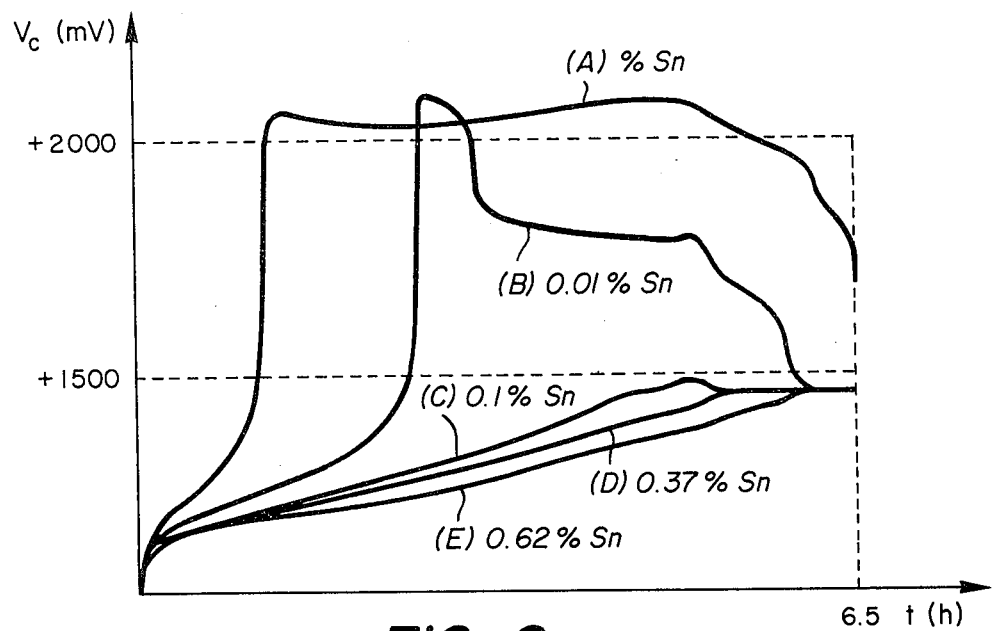

The value of including an appropriate amount of tin in the lead alloy, in accordance with the present invention, will now be explained by means of the experimental results given by way of example hereinbelow, and shown in the accompanying diagram in which:

FIG. 1 shows the potential of the positive electrode of a lead accumulator, after a given recharging time, as a function of the content of tin in the alloy constituting the grid of the positive electrode, and FIG. 2 shows the behaviour of the potential of the positive electrode as a function of time, during a recharging, for different contents of tin in the alloy constituting the grid of the positive electrode.

The table hereinafter shows the charging potential $V_C$ (with respect to $Hg/Hg_2SO_4$ in $H_2SO_4$, density 1.28) for positive electrodes whose grids are formed from different lead alloys containing 0.05% Te, 0.03% As. 0.01% Ag, and X% Sn by weight.

|  | SERIES I | SERIES II | SERIES III |
| --- | --- | --- | --- |
|  | Recharging operation C/7 (after complete discharge at C/6) | Recharging operation 2×C/17 (after complete discharge at C/17) | Recharging operation C/3 (after complete discharge at C/7) |
| X% Sn | $V_C$ after 3 hours | $V_C$ after 2 hours | $V_C$ after 2 hours |
| 0 | + 2062 mV | + 1980 mV | + 2212 mV |

-continued

| X% Sn | SERIES I<br>Recharging operation C/7<br>(after complete discharge at C/6)<br>$V_C$ after 3 hours | SERIES II<br>Recharging operation 2×C/17<br>(after complete discharge at C/17)<br>$V_C$ after 2 hours | SERIES III<br>Recharging operation C/3<br>(after complete discharge at C/7)<br>$V_C$ after 2 hours |
|---|---|---|---|
| 0.02 | + 2038 mV | + 1680 mV | + 2234 mV |
| 0.1 | + 1626 mV | + 1360 mV | + 1793 mV |
| 0.37 | + 1337 mV | + 1340 mV | + 1456 mV |
| 0.62 | + 1277 mV | + 1200 mV | + 1446 mV |
| 1.41 | + 1242 mV | + 1200 mV | + 1444 mV |

The table shows the results of three series of tests in which different amounts of tin were added to the same initial alloy consisting of 99.91% Pb, 0.05% Te, 0.03% As and 0.01% Ag, the amount of Te, As and Ag being the same in each of the grid alloys obtained.

The different alloys obtained (containing 0 to 1.41% Sn) were then used to cast lead accumulator grids which were provided with the positive active mass and assembled with conventional negative electrodes to obtain a standard accumulator unit comprising a positive electrode and two negative electrodes.

The different assembled accumulators with positive electrodes comprising grids formed from each of the alloys were then subjected to discharging/recharging cycles under cycling conditions which were the same within each series of tests, but were different in the respective series, as is shown in the above table.

The potential $V_C$ shown in the above table is the potential of the positive electrode measured after a given recharging time, also shown in this table, for each of the three series I, II and III.

Furthermore, FIG. 1 of the accompanying diagram shows three curves illustrating the values of this potential $V_C$, which are given for the three series appearing in the above table, as a function of the amount of tin in the positive electrode grid.

The polarization remains within acceptable limits provided that the potential of the positive electrode during the charging does not exceed about + 1500 mV (with respect to a Hg/Hg$_2$SO$_4$ electrode in H$_2$SO$_4$ having a density of 1.285). It then appears from the results shown in the above table, as well as in the curves of FIG. 1, that:

An addition of tin of less than 0.1% by weight does not reduce the polarization to the said acceptable limit of + 1500 mV when the recharging rate is relatively high, i.e. in the range between C/7 (series I) and C/3 (series III).

An addition of 0.1% of tin produces a sufficient reduction in the polarization when recharging at a rate of C/8.5 (series II) but not at substantially higher rates.

An addition of 0.37% of tin reduces the polarization to acceptable limits even at a very high recharging rate corresponding to C/3.

Consequently, the amount of tin contained in this alloy should be at least equal to 0.1% by weight, and preferably about 0.2%, so as to enable the recharging to be carried out at high rates going as high as C/7, without excessive polarization. On the other hand, for applications in which the recharging is required at much higher rates, the alloy should preferably contain at least 0.3% and up to 0.5% by weight of tin.

Nevertheless, an amount of tin greater than 0.5% by weight does not provide any particular advantage, and is in other respects undesirable, especially for economic reasons.

From what has been said above it can thus be seen that an excessive polarization may be effectively suppressed in all cases by using a grid alloy having the composition according to the invention, which preferably contains between 0.1% and 0.4% by weight of tin as alloy element, in addition to a small overall amount (up to 0.1%) of arsenic, tellurium and silver, but no antimony.

Comparative tests have also been carried out with a lead alloy containing a relatively small amount of antimony (1.5% by weight) and 0.4% As, the remainder being lead.

Grids made from this alloy were annealed (at 240° C for 1 hour) and were then subjected to a tempering operation by immersing them rapidly in water at ambient temperature so as to increase their mechanical strength, in accordance with the practice recommended for antimony-containing alloys with a very low antimony content.

These annealed and tempered grids were then used to make positive electrodes for a lead accumulator, with which a cycle comprising a discharging operation (C/7) and a charging operation (C/6) was carried out.

With this antimony-containing, annealed and tempered alloy, the potential during the charging is raised to +1839 mV (with respect to Hg/Hg$_2$SO$_4$ in H$_2$SO$_4$ of density 1.285) after 2 hours' charging, which is situated well above the upper limit of about + 1500 mV of an acceptable polarization.

It can thus be seen that the alloy according to the present invention, whose composition does not contain antimony but includes only a very small total amount (maximum 0.1% by weight) of Te, As and Ag, and only about 0.1% to 0.4% of tin by weight, effectively obviates the disadvantages of antimony-containing lead alloys, and at the same time avoids the disadvantages of the polarization of the positive electrodes during the charging of a lead-acid accumulator. FIG. 2 of the accompanying diagram shows a series of experimental polarization curves which illustrate the effect of the addition of different amounts of tin in the composition of the alloy constituting the grid in accordance with the invention, on the course of the potential of the positive electrode undergoing recharging under given conditions.

The composition of the alloys used to form the grids of the positive electrodes which provided these polarization curves shown in FIG. 2 contained in all cases: 0.05% Te; 0.03% As; and 0.01% Ag by weight. These electrodes were basically identical, with the exception of the amount of tin contained in the alloy of the grid, namely:

0% Sn in curve A
0.01% Sn in curve B
0.1% Sn in curve C
0.37% Sn in curve D 0.62% Sn in curve E As can be seen from FIG. 2 of the accompanying diagram, the polarization curves of the positive electrodes were measured during a recharging lasting about 6.5 hours, i.e. a recharging rate of approximately C/6, which was chosen by way of example. In each test this recharging was carried out immediately following a complete discharging carried out at a rate of about C/7.

These polarization curves show the following effects:

In the case of curve A on the one hand, where the composition of the grid alloy does not contain any tin, the potential of the positive electrode subjected to recharging rises rapidly to a value above + 2000 mV (with respect to $Hg/Hg_2SO_4$), and a very marked polarization is observed for most of the recharging period.

Similarly, in the case of curve B, where the grid alloy contains only 0.01% of tin, a very marked polarization is observed for most of the recharging period, although the maximum above + 2000 mV has a peak which is more pronounced in the case of curve B than in curve A.

On the other hand, the polarization curves C to E are situated far below curves A and B, and show only a gradual rise in the measured polarization potential, which remains below + 1500 mV up to the end of the recharging period.

These curves C to E consequently show the very substantial diminution which can be achieved in the polarization of the positive electrode when the composition of the positive grid alloy contains an amount of tin in the range between 0.1% and 0.62% by weight.

From what has been said above, it can thus be seen that the composition of the lead alloy which is the object of the invention should contain at least 0.1% by weight of tin in order to ensure a satisfactory reduction in the polarization potential, although the amount of tin contained in this alloy may be increased above 0.1% if necessary, in order to ensure that the polarization potential is sufficiently low during the recharging of positive electrodes in all cases, and in particular when quicker recharging than specified in the above table is required.

We claim:

1. In an electrode grid for a lead accumulator, the grid comprising a lead alloy which is substantially free from antimony, said alloy containing the elements tellurium, arsenic and silver in a total concentration of at most 0.1% by weight, the improvement comprising said alloy containing at least 0.1% by weight of tin, the balance of said alloy being pure lead.

2. The electrode grid of claim 1, wherein the content of tin in the alloy is at least 0.2% by weight.

3. The electrode grid of claim 1, wherein the content of tin in the alloy is from about 0.3 to about 0.5% by weight.

4. In a lead accumulator having electrode grids consisting essentially of a lead alloy containing tellurium, arsenic and silver in a total concentration no more than 0.1% by weight, the improvement comprising: said alloy containing tin in a concentration of at least 0.1% by weight, the balance of said alloy being substantially pure lead, said alloy being substantially free of antimony.

5. A method of suppressing polarization of a lead alloy electrode grid in a lead accumulator, said lead alloy electrode grid having a total concentration of tellurium, arsenic and silver no more than 0.1 weight percent and being substantially free of antimony, polarization of said grid being suppressed by including more than 0.1 percent by weight tin in said alloy the balance of said alloy being pure lead.

* * * * *

UNITED STATES PATENT AND TRADEMARK OFFICE
CERTIFICATE OF CORRECTION

PATENT NO. : 4,092,462

DATED : May 30, 1978

INVENTOR(S) : Herbert Giess et al.

It is certified that error appears in the above-identified patent and that said Letters Patent are hereby corrected as shown below:

Under "Foreign Application Priority Data" the filing date of the Swiss Application should read "April 13, 1976" rather than "April 13, 1977.

Signed and Sealed this

Sixth Day of March 1979

[SEAL]

Attest:

RUTH C. MASON
*Attesting Officer*

DONALD W. BANNER
*Commissioner of Patents and Trademarks*